United States Patent [19]

Yamada et al.

[11] Patent Number: 4,587,855
[45] Date of Patent: May 13, 1986

[54] TENSIONMETER

[75] Inventors: Yoji Yamada, Uesatominaminomachi; Michinori Matsuura, Shiga; Yoshiaki Kakeshita, Kyoto, all of Japan

[73] Assignee: Shimpo Kogyo Kabushiki Kaisha, Kyoto, Japan

[21] Appl. No.: 702,132

[22] Filed: Feb. 15, 1985

[51] Int. Cl.⁴ ............................................. G01L 5/10
[52] U.S. Cl. ........................................... 73/862.48
[58] Field of Search ..................... 73/862.45–862.48

[56]  References Cited
U.S. PATENT DOCUMENTS 3,398,575  8/1968  Saxl .......................... 73/862.48 X
3,540,271  11/1970  Hoff ............................. 73/862.41

FOREIGN PATENT DOCUMENTS 0691123  5/1953  United Kingdom ............ 73/862.48
1359077  7/1974  United Kingdom ............ 73/862.48

*Primary Examiner*—Charles A. Ruehl
*Attorney, Agent, or Firm*—Christensen, O'Connor, Johnson & Kindness

[57]  ABSTRACT

A tensionmeter of the type that the tension of an elongated object is measured by the amount of displacement of a sensing roller, wherein errors caused by the bending stress of the elongated object as well as the weight of the detector including the sensing roller are substantially elimiated from the result of measurement.

3 Claims, 8 Drawing Figures

TENSIONMETER

BACKGROUND OF THE INVENTION

This invention relates to a tensionmeter for measuring the tension of an elongated object, such as a wire, tape, sheet or the like.

There is known a tensionmeter comprising three rollers arranged in the direction in which an elongated object to be measured (which will be referred to simply as an object) passes in successive contact with the rollers, the middle one of which is a sensing roller, so that the tension of the object may be measured by displacement of the sensing roller caused by the tension of the object. In this instrument, however, since tension is measured only by displacement of the sensing roller, measurement can not be conducted with high accuracy and precision. As the object passes the three rollers, it is bent into V-shape, so that a bending stress due to the inherent rigidity of the material of the object acts on the sensing roller as a displacing force, which causes errors in the result of the measurement.

To the best knowledge of the present inventors, there have been no tensionmeters in which the bending stress caused by the rigidity of the material of the object is taken into consideration.

One of the problems involved in the three-roller arrangement is the position or orientation of the detector including the three rollers. There will be no problem if the angle between the direction in which the sensing roller is displaced by the tension of the object under measurement and the direction of gravity is always a right angle. However, if the angle is not a right angle, the spring which resiliently supports the sensing roller receives not only the force caused by the tension of the object but also a component of the weight of the detector, so that errors are introduced into the result of the measurement. There are known no tensionmeters which are provided with means for eliminating the errors caused by the position of the detector.

SUMMARY OF THE INVENTION

Accordingly, it is one object of this invention to eliminate errors caused by the bending stress of an object to be measured when the tension of the object is measured by the amount of displacement of a sensing roller.

Another object of the invention is to eliminate errors caused by the weight of the detector when the tension of an object is measured by the amount of displacement of a sensing roller in the detector.

The invention will be described in detail with reference to the accompanying drawings.

PRINCIPLE OF THE INVENTION

Figure 1:
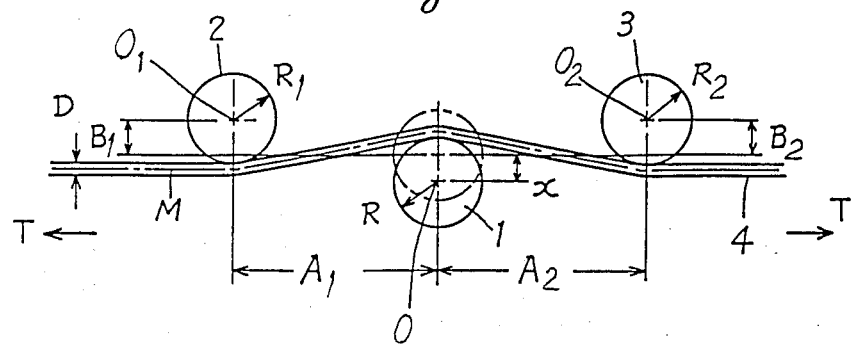
FIG. 1 is a somewhat schematic, enlarged front view of the sensing roller and the guide rollers of a tensionmeter for explanation of the principle of this invention.

First the principle of measurement on which the invention is based will be described with reference to FIG. 1 which schematically shows the detector of a tensionmeter of the type with which the invention is concerned. The detector comprises a pair of guide rollers 2 and 3 spaced apart from each other and a sensing roller 1 interposed between the two guide rollers. An object such as a wire 4 the tension of which is to be measured passes the three rollers in contact therewith. Let the radii of the rollers 1, 2 and 3 be R, $R_1$ and $R_2$, respectively; the diameter or thickness of the object 4 be D; the horizontal distance between the axes of the rollers 1 and 2 be $A_1$ and that between the rollers 1 and 3 be $A_2$; the vertical distance between the axes of the rollers 1 and 2 be $B_1$ and that between the axes of the rollers 1 and 3 be $B_2$ when there is no load imposed on the roller 1 (shown by a dot-and-dash line circle) by the tension of the object; the amount of vertical displacement of the roller 1 caused by tension of the object be x; and the tension of the object 4 be T. Here, the word "vertical" means the direction in which the sensing roller 1 is movable in the instrument and the word "horizontal" means the direction perpendicular to the "vertical" direction.

Figure 2:
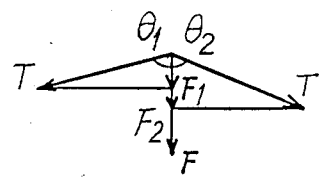
FIG. 2 is a vector diagram of FIG. 1.

If the angles which those portions of the object 4 which extend between the points of contact with the rollers 1 and 2 and between the points of contact with the rollers 1 and 3 make with the vertical line which passes the axis of the roller 1 are $\theta_1$ and $\theta_2$, respectively, and the forces which the tensions of the above-mentioned portions of the object 4 exert on the roller 1 are $F_1$ and $F_2$, a vector diagram as shown in FIG. 2 is obtained.

With the centerline of the object 4 being shown by a dot-and-dash line M in FIG. 1, if the straight-line portion of the line M between the rollers 1 and 2 extend in opposite directions, it intersects the vertical lines passing the axes of the rollers 1 and 2 at points $N_1$ and $N_2$, respectively. If the distance between the point $N_1$ and the axis O of the roller 1 is $P_1$, the distance between the point $N_2$ and the axis $O_1$ and the axis $O_1$ of the roller 2 is $P_2$, and the vertical distance between the points $N_1$ and $N_2$ is Q, a geometric relation as shown in FIG. 3 will be obtained.

From the vector diagram of FIG. 2 we obtain $$T \cos \theta_1 + T \cos \theta_2 = kx \tag{1}$$

where k is the spring constant of a spring acting on the roller 1 in the direction opposite to the direction in which the tension of the object acts on the roller.

Figure 3:
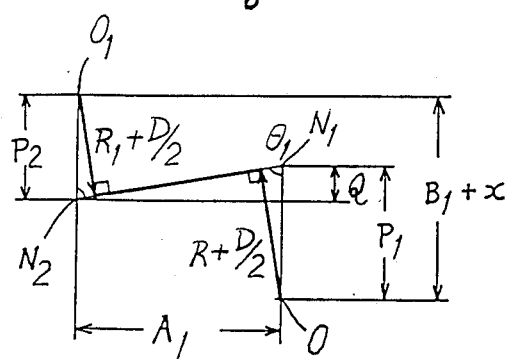
FIG. 3 is an analytic diagram of FIG. 1.

From FIG. 3 we obtain $$P_2 - (B_1 + x) + P_1 = Q$$

$$R_1 + D/2 = P_2 \sin \theta_1$$

$$R + D/2 = P_1 \sin \theta_1$$

$$A_1 = Q \tan \theta$$

By solving the above equations for $\cos \theta_1$, we obtain $$\cos\theta_1 = \frac{A_1(R + R_1 + D) - (B_1 + x)\sqrt{A_1^2 + (B_1 + x)^2 - (R + R_1 + D)^2}}{A_1^2 + (B_1 + x)^2}$$

In a similar manner we obtain $$\cos\theta_2 = \frac{A_2(R + R_2 + D) - (B_2 + x)\sqrt{A_2^2 + (B_2 + x)^2 - (R + R_2 + D)^2}}{A_2^2 + (B_2 + x)^2}$$

By substituting the above two expressions into the equation (1) we can obtain the tension T. If $A_1=A_2$, $B_1=B_2$, and $R=R_1=R_2$, the tension T will be given by $$T = \frac{kx\{A^2 + (B + x)^2\}}{2\{A \cdot (2R + D) - (B + x)\sqrt{A^2 + (B + x)^2 - (2R + D)^2}\}} \quad (2)$$

If, with the object 4 passing the rollers in contact therewith, the roller 1 is displaced a distance x, the tension T can be calculated by introducing the value x into the equation (2). The relation between T and x can be expressed not only by the above equation but also by other equations in different ways. Therefore, the above equation will be expressed as a general formula $$T = F(x) \quad (3)$$

The above equation is valid only with an ideal object that has no rigidity and when the influence by gravity is neglected, and if the tension is calculated by using the above equation, errors will be introduced into the result of the calculation as previously mentioned.

Figure 4:
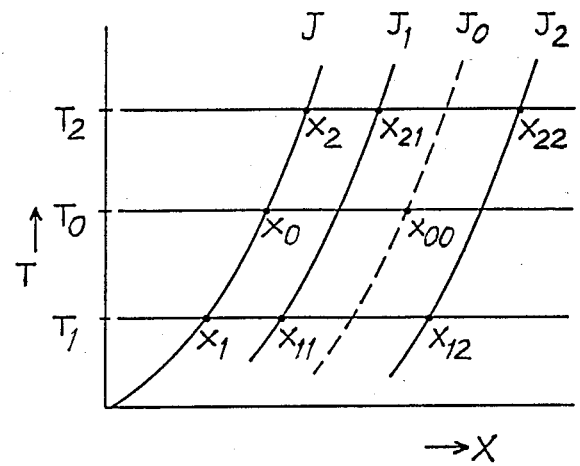
FIG. 4 is a graph showing characteristic curves.

When the rigidity of the object is taken into consideration, the relation between the tension T and the displacement X will be obtained in the following manner. The rigidity of the object is believed to have a relation to the diameter D thereof. If the tension T of an object having a diameter D is calculated from the displacement X by using the formula (3), a characteristic curve J shown in FIG. 4 results. When the tension of two objects of the same material having diameters $D_1$ and $D_2$, respectively, has actually been measured by using the same tensionmeter, characteristic curves $J_1$ and $J_2$ have been obtained. The theoretical characteristic curve J is geometrically similar to the actual characteristic curves $J_1$ and $J_2$ and mathematically the three curves have a "linear" relation to each other along the X axis. As mentioned above, since there is a certain relation between the diameter D and the rigidity, the curves have a "linear" relation to each other also with respect to the diameter D. Therefore, provided that an object having a given diameter $D_0$ gives a characteristic curve $J_0$, the relation between the displacement $X_0$ and $X_{00}$ on the curves J and $J_0$ caused by the same tension $T_0$ can be expressed as the following linear equation:

$$X_{00} = (K_{11} \cdot D_0 + K_{10}) \cdot X_0 \cdot K_{01} \cdot D_0 + K_{00}$$

where $K_{11}$, $K_{10}$, $K_{01}$ and $K_{00}$ are constants.

The above equation can be transformed to $$X_{00} = K_{11} \cdot D_0 \cdot X_0 + K_{10} \cdot X_0 + K_{01} \cdot D_0 + K_{00} \quad (4)$$

The above equation is valid with respect to the characteristic curves J and $J_1$ and also with respect to the characteristic curves J and $J_2$. Therefore, at points $(T_1 \cdot X_1)$, $(T_1 \cdot X_{11})$, $(T_1 \cdot X_{12})$, $(T_2 \cdot X_2)$, $(T_2 \cdot X_{21})$ and $(T_2 \cdot X_{22})$, we have $$X_{11} = K_{11} \cdot D_1 \cdot X_1 + K_{10} \cdot X_1 + K_{01} \cdot D_1 \cdot K_{00}$$

$$X_{12} = K_{11} \cdot D_2 \cdot X_1 + K_{10} \cdot X_1 + K_{01} \cdot D_2 + K_{00}$$

$$X_{21} = K_{11} \cdot D_1 \cdot X_2 + K_{10} \cdot X_2 + K_{01} \cdot D_1 + K_{00}$$

$$X_{22} = K_{11} \cdot D_2 \cdot X_2 + K_{10} \cdot X_2 + K_{01} \cdot D_2 + K_{00}$$

To solve the above simultaneous equations for $K_{11}$, $K_{10}$, $K_{01}$ and $K_{00}$, we first rewrite these equations $$X_{11} = K_{111} \cdot X_1 + K_{011}$$

$$X_{12} = K_{112} \cdot X_1 + K_{012}$$

$$X_{21} = K_{111} \cdot X_2 + K_{011}$$

$$X_{22} = K_{112} \cdot X_2 + K_{012} \quad (5)$$

where $$K_{111} = K_{11} \cdot D_1 + K_{10}$$

$$K_{011} = K_{01} \cdot D_1 + K_{00}$$

$$K_{112} = K_{11} \cdot D_2 + K_{10}$$

$$K_{012} = K_{01} \cdot D_2 + K_{00} \quad (6)$$

From the equations (5) we obtain $$K_{111} = (X_{11} - X_{21})/(X_1 - X_2)$$

$$K_{011} = (X_1 \cdot X_{21} - X_2 \cdot X_{11})/(X_1 - X_2)$$

$$K_{112} = (X_{12} - X_{22})/(X_1 - X_2)$$

$$K_{012} = (X_1 \cdot X_{22} - X_2 \cdot X_{12})/(X_1 - X_2)$$

The values of the terms at the right sides of these equations are known from the result of actual measurement.

From the equations (6) we obtain $$K_{11} = (K_{111} - K_{112})/(D_1 - D_2)$$

$$K_{10} = (D_1 \cdot K_{112} - D_2 \cdot K_{111})/(D_1 - D_2)$$

$$K_{01} = (K_{011} - K_{012})/(D_1 - D_2)$$

$$K_{00} = (D_1 \cdot K_{012} - D_2 \cdot K_{011})/(D_1 - D_2) \quad (7)$$

On the other hand from the equation (4) we obtain $$X_0 = (X_{00} - K_{01} \cdot D_0 - K_{00})/(K_{11} \cdot D_0 + K_{10}) \quad (8)$$

At the right side of the above equation we can obtain the values of the terms except $X_{00}$ and $D_0$ from the equation (7). Therefore, measurement is performed on an object having a diameter $D_0$ to obtain a displacement $X_{00}$, and putting these values into the equation (8) it is possible to obtain from the actually measured displacement $X_{00}$ the displacement $X_0$ which would be caused by an ideal object which has no rigidity. Substituting the value $X_0$ thus obtained for the variable x in the formula (3), we can obtain the tension T of the object which is not influenced by the rigidity of its material. In practice, it takes much time to obtain $X_0$ by performing the above operations and then put the value $X_0$ into the formula (3) for further operation. Therefore, the values of the function T for a plurality of values of the variable $X_0$ may conveniently be stored in a ROM beforehand, so that a desired one of the stored values of $X_0$ can be read out from the ROM.

Figure 5A:
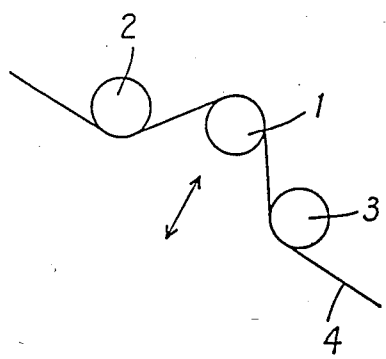
FIG. 5(a) is a view similar to FIG. 1 but showing the rollers in an inclined position.
Figure 5B:
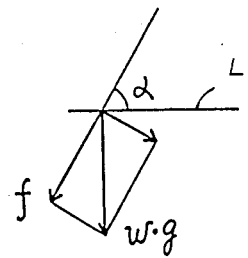
FIG. 5(b) is an analytic diagram of FIG. 5(a)

The influence that the weight of the movable part of the detector exerts on the result of measurement will now be described. Suppose that the arrangement of the rollers 1, 2 and 3 is inclined as shown in FIG. 5(a). If the angle which the direction of displacement of the sensing roller 1 caused by the tension of the object 4 makes with the horizontal line L is expressed by $\alpha$, the mass of the movable part of the detector is expressed by w(gr), and the acceleration of gravity is expressed by g(CN/gr), as shown in FIG. 5(b) the force f which acts on the spring resiliently counter-acting the displacement of the roller 1 is given as $$f = g \cdot w \sin \alpha$$

This force f is added to the force F caused by the tension of the object to displace the roller 1, so that the sum of the forces F and f acts on spring. Thus the equation (1) is expressed as $$T \cos \theta_1 + T \cos \theta_2 + f = kx$$

From the above equation we obtain $$T = \frac{kx - f}{\cos\theta_1 + \cos\theta_2} = \left(1 - \frac{f}{kx}\right)\left(\frac{kx}{\cos\theta_1 + \cos\theta_2}\right)$$

where $$\frac{kx}{\cos\theta_1 + \cos\theta_2}$$

represents the tension when the direction of displacement of the roller 1 is neglected. If it is expressed by f(x), we obtain $$T = \left(1 - \frac{f}{kx}\right) \cdot f(x)$$

If the displacement of the roller 1 when the tension is 0 is $x_t$, $f = kx_t$. Substituting this into the above equation, we obtain $$T = \left(1 - \frac{x_t}{x}\right) \cdot f(x) \tag{9}$$

Therefore, if the tension f(x) is calculated from the displacement x of the roller 1, and the values f(x), x and $x_t$ are put into the equation (9), the tension T obtained is substantially free of any error which would otherwise be caused by the weight of the detector.

PREFERRED EMBODIMENT OF THE INVENTION

Figure 6:
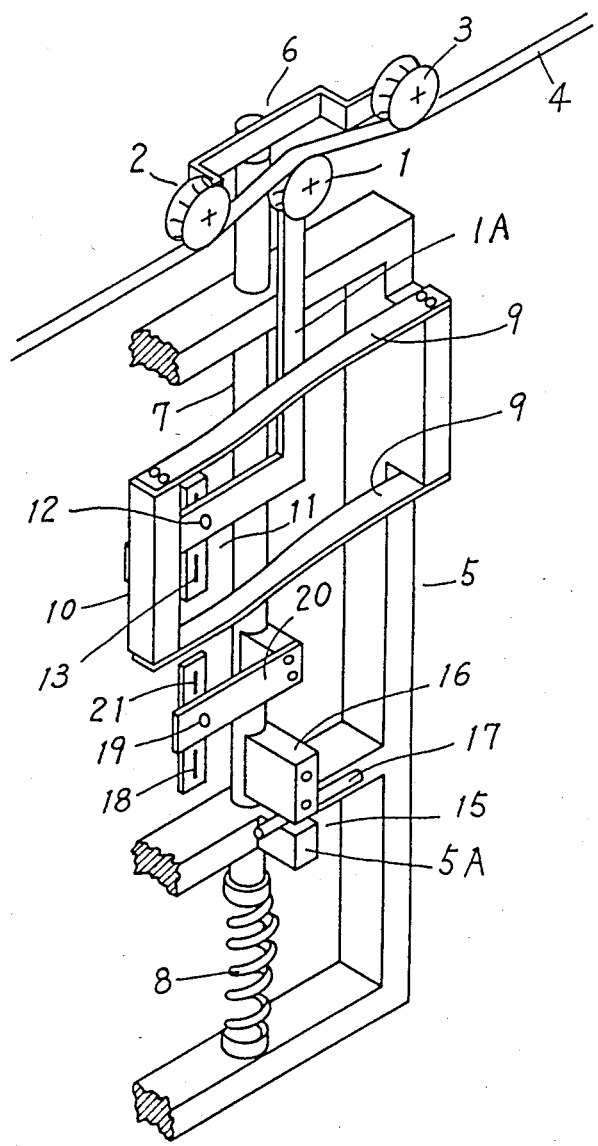
FIG. 6 is a somewhat schematic perspective view of one embodiment of the invention.
Figure 7:
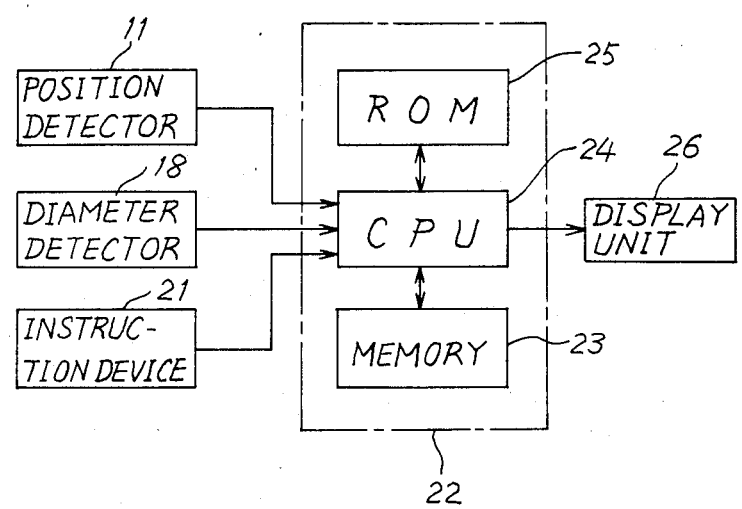
FIG. 7 is a block diagram of the operation and data processing system of the tensionmeter constructed in accordance with the invention.

Turning now to FIGS. 6 and 7, there is shown a tensionmeter constructed in accordance with the invention. The tensionmeter comprises a frame 5, an arm 6 for supporting a pair of guide rollers 2 and 3 spaced a determined distance apart from each other, a movable rod 7 supported by the frame 5 to support the arm 6 at the top end thereof, and a spring 8 interposed between the lower end of the rod 7 and the frame 5 so as to pull the rod 7 downwardly. The rod 7 is movable in a direction perpendicular to the straight line connecting the axes of the rollers 2 and 3. The device further comprises a movable rod 1A for supporting a sensing roller 1. The rod 1A is connected to an arm 10 which has its opposite ends connected to the outer ends of a pair of leaf springs 9 supported at their inner ends by the frame 5. When the roller 1 is moved up or down, the rod 1A is moved up or down against the resiliency of the leaf springs 9. The roller 1 and the rod 1A are movable in the same direction as the rod 7. The springs have the constant k previously referred to in the equation (1).

The tensionmeter further comprises a detector 11 for detecting the position or displacement of the roller 1. The detector 11 can be an image sensor of the CCD type for detecting the displacement of the rod 1A. The image sensor comprises a light emitting element 12 provided on the rod 1A and a vertical array of photosensitive elements 13. As the rod 1A is displaced, so is the light emitting element 12, so that the photosensitive element 13 that receives the light from the light emitting element 12 changes. It is possible to obtain the amount of displacement of the rod 1A from the position of the photosensitive element that receives the light from the light emitting element.

The tensionmeter further comprises a device 15 for compensating the position of the rollers 2 and 3 in accordance with the diameter of the object 4. The compensator 15 comprises a projection 5A integral with the frame 5 and a block 16 fixed to the rod 7 in alignment with the projection 5A. A gauge 17 of the same diameter as the object 4 to be measured is sandwiched between the projection 5A and the block 16, thereby to displace the rod 7 upwardly as far as the diameter of the gauge 17. The displacement is accompanied by the corresponding upward displacement of the reference position of the rollers 2 and 3. Therefore, provided that the tension of the object 4 acting on the roller 1 remains the same, the angles $\theta_1$ and $\theta_2$ in FIG. 2 which the straight portions of the object 4 passing the roller 1 in contact therewith makes with the straight line passing the axis of the roller and extending in the direction in which the roller 1 is movable remain substantially the same regardless of the diameter of the object 4. If the positions of the rollers 2 and 3 were not adjusted, an object having a larger diameter must render the above-mentioned angles smaller even when the tension was the same. In accordance with the invention, however, since the rollers 2 and 3 are raised a distance corresponding to the diameter of the object, approximately the angles become those obtained when the diameter is zero. Provided that there is no influence by the rigidity of the object, the angles remain substantially the same with the same tension regardless of the diameter of the object.

The diameter of the object to be measured is detected by a detector 18, which is designed to detect the diameter by the displacement of the rod 7 and can be an image sensor of the CCD type. The detector comprises a light emitting element 19 provided on an arm 20 fixed to the rod 7, and a vertical array of photosensitive elements 21. Upon displacement of the rod 7, the photosensitive element that receives the light from the light emitting element changes so that the amount of displacement of the rod 7 can be detected, and from this amount of displacement the diameter of the object can be obtained. Either of the two arrays of photosensitive elements 13 and 21 may be used for the purpose of the other.

As can be easily understood from the arrangement of FIG. 6, the amount of displacement of the roller 1 and the diameter of the object 4 can be detected by the detectors 11 and 18.

Since the spring 8 exerts on the rod 7 a force greater than the counterforce of the roller 1 (the resiliency of the springs 9), the rollers 2 and 3 are not displaced up or down during the course of measurement. The weight of the roller 1 (and the weights of the rod 1A, the springs 9, etc.) provide a force to lower the roller 1. The force caused by the weights changes with the position required for the roller 1 to take during measurement, as previously mentioned. If it is required to eliminate errors caused by the weights, the position detector 11 is operated by an instruction provided by an instruction device 21 as shown in FIG. 7 so as to measure the amount of displacement of the roller 1 when the tension of the object 4 acting on the roller 1 is zero, and the measured value is stored in the RAM of a memory 23 of a microcomputer 22 through a CPU 24 thereof, so that the value of the tension obtained by the measurement and operation to be described presently may be corrected by the stored value. For example, substituting the value $X_0$ obtained from the equation (8), the value T of the formula (3) with the value $X_0$ as the variable, and the value XT stored in the memory 23 into $$T \cdot \left(1 - \frac{XT}{X_0}\right)$$

where $X_0 \neq 0$, we can obtain the tension of the object without any influence by the weight of the detector. If the influence by the weight is negligible, the above operation is not required.

The values detected by the detectors 11 and 18 are also applied to the CPU 24. There is provided a ROM 25 which stores the functional values of the formula (3) calculated for a plurality of values of $X_0$ obtained by the previously mentioned operations in the addresses corresponding to the values of $X_0$. The provision of the ROM conveniently eliminates the necessity of performing the operation of the formula (3).

For measurement an object 4 to be measured is extended to pass the rollers 1 to 3 in contact therewith as shown in FIG. 6. The tension of the object 4 causes the roller 1 to be displaced downwardly, and the amount of displacement is detected by the position detector 11. The detected value $X_{00}$ is applied to the CPU 24, to which the detected value $D_0$ from the diameter detector 18 is also applied. The CPU performs necessary operations in accordance with the equation (8) to obtain the value $X_0$, and access is then made to that one of the addresses in the ROM 25 which corresponds to the value $X_0$ to read out the corresponding value of the tension T of the general formula (3) stored therein beforehand.

If it is necessary to eliminate the previously mentioned influence by the weight of the detector, the CPU performs the previously mentioned operations on the value T. The tension T thus obtained is indicated on a display unit 26.

Thus the tensionmeter of the invention enables accurate measurement of the tension of an elongated object by eliminating any errors which the rigidity of the material of the object and/or the weight of the detector would otherwise introduce into the result of measurement.

What we claim is:

1. A tensionmeter comprising:
   (a) a pair of guide rollers spaced a predetermined distance apart from each other;
   (b) a sensing roller interposed between said pair of guide rollers and being displaceable by the tension of an elongated object to be measured, said object extending in contact with said guide rollers and said sensing roller;
   (c) first detecting means for detecting the amount of displacement of said sensing roller caused by the tension of said elongated object;
   (d) second detecting means for detecting the diameter or thickness of said elongated object;
   (e) means for conducting operations on the detected values from said first and second detecting means to obtain an ideal amount of displacement of said sensing roller provided that the material of said elongated object has no rigidity; and
   (f) means for calculating a tension as a function of said ideal amount of displacement of said sensing roller as the variable and considering said calculated tension as the tension of said object.

2. A tensionmeter comprising:
   (a) a pair of guide rollers spaced a predetermined distance apart from each other;
   (b) a sensing roller interposed between said pair of guide rollers and being displaceable by the tension of an elongated object to be measured, said object extending in contact with said guide rollers and said sensing roller;
   (c) first detecting means for detecting the amount of displacement x of said sensing roller caused by the tension of said elongated object;
   (d) first operation means for performing operations on said amount x detected by said first detecting means to obtain said tension f(x);
   (e) second displacement means for detecting the amount of displacement $x_t$ of said sensing roller between the position thereof when the direction of displacement of said sensing roller is perpendicular to the direction of gravity acting on said sensing roller with no tension acting thereon and the position of said sensing roller at the time of measurement with no tension acting thereon; and (f) second operation means for performing operations on the values detected by said first and second detecting means, and said value f(x) provided by said first operation means to obtain $(1-x_t/x)\cdot f(x)$ as the tension of said elongated object.

3. The tensionmeter of claim 2, wherein said first operation means comprises:
  means for conducting operations on the value detected by said first detecting means and the value detected by means for detecting the diameter or thickness of said object to obtain an ideal amount of displacement of said sensing roller provided that the material of said elongated object has no rigidity; and
  means for calculating a tension as a function of said ideal amount of displacement of said sensing roller as the variable.

* * * * *